United States Patent [19]
Rader et al.

[11] 3,748,366
[45] July 24, 1973

[54] TEACHING AID FOR DEMONSTRATING DRUG CIRCULATION OR THE LIKE IN HUMAN BODY

[76] Inventors: James R. Rader, 631 S.E. 26th, Edmond, Okla. 73034; Paul W. Smith, 3812 Meadowbrook, Lawton, Okla. 73501

[22] Filed: Sept. 30, 1971

[21] Appl. No.: 185,033

[52] U.S. Cl. .................................................. 35/17
[51] Int. Cl. ........................................... G09b 23/28
[58] Field of Search ........................................ 35/17

[56] References Cited
UNITED STATES PATENTS

| | | | |
|---|---|---|---|
| 2,324,702 | 7/1943 | Hoffmann | 35/17 |
| 3,376,659 | 4/1968 | Asin | 35/17 |
| 3,426,449 | 2/1969 | Van Noy | 35/17 |

*Primary Examiner*—Harland S. Skogquist
*Attorney*—Dunlap, Laney, Hessin & Dougherty

[57] ABSTRACT

A teaching aid to demonstrate circulation of a drug or the like through the organs of the body the drug being administered either orally or intravenously, and which includes a transparent model of the upper portion of a human body including a head portion, body portion and a pair of arms. Transparent conduits interconnect a plurality of model organ members including a heart member, brain member, liver member, kidney member and stomach member. Another conduit interconnects the mouth of the heat portion and the stomach member. A valve for controlling flow through the transparent conduits is also disclosed.

8 Claims, 4 Drawing Figures

PATENTED JUL 24 1973

3,748,366

INVENTORS.
JAMES R. RADER &
PAUL W. SMITH

BY Dunlap, Laney, Hessin & Dougherty
ATTORNEYS

3,748,366

TEACHING AID FOR DEMONSTRATING DRUG CIRCULATION OR THE LIKE IN HUMAN BODY

BACKGROUND OF THE INVENTION

1. Field of the Invention

This invention relates to improvements in teaching aids and more particularly, but not by way of limitation, to improvements in teaching aids for demonstrating drug circulation or the like in the human body.

2. Description of the Prior Art

Growing public awareness of drug abuse in the United States has resulted in increased emphasis on drug abuse education. One area of educational emphasis is with the youth of the country. In many communities the education program is handled by the schools.

It is well known that the utilization of a visual teaching aid can greatly assist an instructor especially when the instruction centers on the internal functions of the human body.

Up to this time there has been no visual teaching aid available which can illustrate, in vivid realism, the flow of a drug through the human body resulting from either intravenous injection or oral ingestion.

Further, no visual drug abuse teaching aid has been made available which is simple enough for elementary school age children to operate with minimum instruction and supervision.

SUMMARY OF THE INVENTION

The present invention contemplates a teaching aid which comprises a base having a rear panel secured thereto and extending upwardly therefrom and having a front side and a rear side. A front panel in the general shape of the upper front portion of the human body and having an inner surface and an outer surface is secured to the front side of the rear panel. A plurality of organ members, each formed in the general shape of a human body organ, are secured to the front side of the rear panel between the rear panel and front panel. First conduit means communicates with the front panel for conducting a fluid from a source beyond the outer surface of the front panel through the front panel and through the organ members.

An object of the present invention is to provide a vividly realistic teaching aid for illustrating the flow of a drug through the human body resulting from either intravenous injection or oral ingestion.

Another object of the present invention is to provide a visual drug abuse teaching aid which is uncomplicated and simple to operate.

A further object of the present invention is to provide a visual drug abuse teaching aid which is economical in construction.

Other objects and advantages of the present invention will be evident from the following detailed description when read in conjunction with the accompanying drawings.

DESCRIPTION OF THE PREFERRED EMBODIMENT

Figure 1:
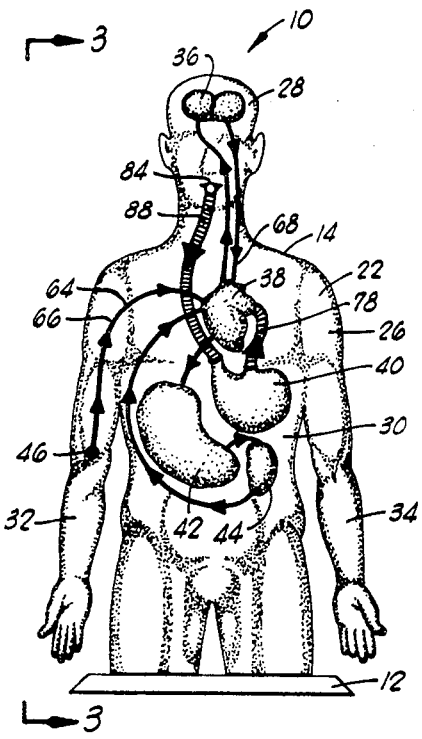
FIG. 1 is a front elevational view of a teaching aid constructed in accordance with the present invention.

Referring now to the drawing, reference character 10 generally designates a teaching aid constructed in accordance with the present invention. The teaching aid 10 comprises a base 12 and a human body model 14 mounted on the base 12 and extending upwardly therefrom.

The body model 14 comprises a rear panel 16 having a front side 18 and a rear side 20, and a front panel 22 having an inner surface 24 and an outer surface 26, the front panel 22 being mounted on the front side 18 of the rear panel 16. The rear panel 16 is substantially flat and is preferably formed of a suitable molded synthetic resin material of a suitable solid opaque color. The front panel 22 is preferably formed of a suitable transparent synthetic resin material and is molded in the form of the upper portion of a human male body.

The body model 14 includes a head portion 28, a body portion 30, a right arm portion 32 and a left arm portion 34. Five major human body organ members are mounted within the body model 14 on the front side 18 of the rear panel 16. A brain organ member 36 is mounted in the head portion 28 of the body model 14 and a heart organ member 38, a stomach organ member 40, a liver organ member 42 and a kidney organ member 44 are each mounted in the body portion 30 of the body model 14. The five organ members are located on the rear panel 16 in the positions they ordinarily occupy in the human body. The organ members are preferably formed of a suitable molded synthetic resin and each organ member is of a different bright color.

An aperture 46 is formed in the right arm portion 32 of the front panel 22 with an elastomeric grommet 48 installed therein. A second aperture 50 is formed in the body portion 30 of the rear panel 16 and has an elastomeric grommet 52 installed therein. A third aperture 54 is formed in the body portion 30 of the rear panel 16 and has an elastomeric grommet 56 installed therein. A fourth aperture 58 is formed in the body portion 30 of the rear panel 16 and has an elastomeric grommet 60 installed therein. It should be noted that the aperture 50 is positioned behind the heart organ member 38 while the apertures 54 and 58 are each located behind the stomach organ member 40. The grommets 48 and 56 are preferably formed so as to close the respective apertures 46 and 54 when in the relaxed position.

A suitable valve 62, of conventional design, is mounted on the rear panel 16 behind the heart organ member 38. The valve 62 is adapted to be manually controlled from behind the rear side 20 of the rear panel 16 for purposes which will be described more fully hereinafter.

A first conduit 64 is disposed within the body model 14 and comprises a first segment 66 and a second segment 68. The first conduit 64 is preferably formed of transparent flexible plastic tubing having a ⅛ inch inside diameter. One end portion 70 of the first segment 66 communicates with the aperture 46 formed in the front panel 22 and is sealingly engaged by the grommet 48 installed therein. The opposite end portion 72 of the first segment 66 is connected to the valve 62.

Figure 2:
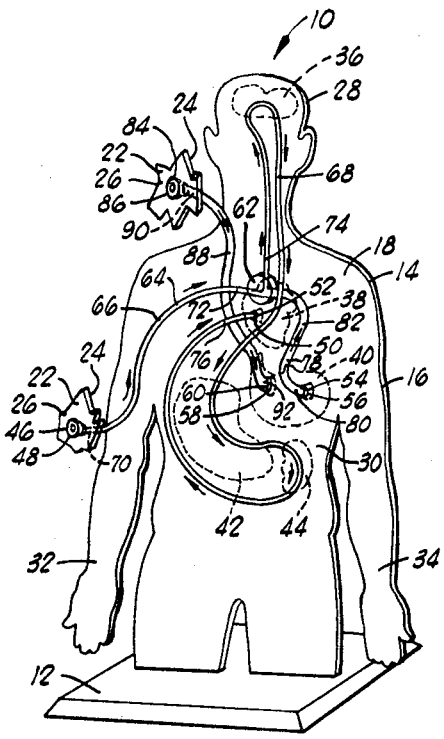
FIG. 2 is a perspective view of the teaching aid shown in FIG. 1 with a portion of the front panel broken away and organ members removed to more clearly illustrate the routing of conduits.
Figure 3:
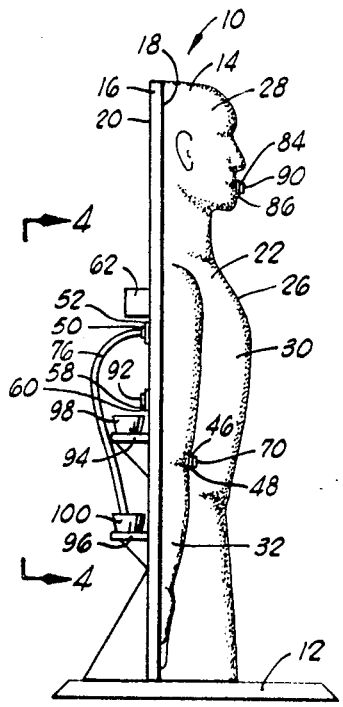
FIG. 3 is a side elevational view taken along line 3—3 of FIG. 1.

One end portion 74 of the second segment 68 of the first conduit 64 is connected to the valve 62. The opposite end portion 76 of the second segment 68 extends through the aperture 50 formed in the rear panel 16 and is sealingly engaged by the grommet 52 installed therein. As best shown in FIG. 2, the second segment 68 is routed from the valve 62 to the brain organ member 36, from the brain organ member 36 back to the heart organ member 38, from the heart organ member to the liver organ member 42, from the liver organ member 42 to the kidney organ member 44, and from the kidney organ member 44 back to the heart organ member 38 and through the aperture 50.

A second transparent conduit 78, also preferably formed of transparent plastic tubing having a ⅛ inch inside diameter, is disposed within the body model 14. One end 80 of the second conduit 78 communicates with the aperture 54 formed in the rear panel 16 and is sealingly engaged by the grommet 56 installed therein. The opposite end 82 of the conduit 78 is connected to the valve 62. As shown in FIG. 2, the conduit 78 is routed from the stomach organ member 40 to the heart organ member 38.

An aperture 84 is formed in the head portion 28 of the front panel 22 to form a mouth opening. An elastomeric grommet 86 is installed in the aperture 84. A third conduit 88, preferably formed of transparent plastic tubing having an inside diameter of one-quarter inch, is disposed within the body model 14. One end 90 of the conduit 88 communicates with the aperture 84 and is sealingly engaged by the grommet 86. The opposite end 92 of the conduit 88 communicates with the aperture 58 and is sealingly engaged by the grommet 60 installed therein. It should be noted that the conduit 88 is routed from the mouth opening in the head portion 28 of the front panel 22 to the stomach organ member 40 thereby simulating the human esophagus.

The total internal volume of the first conduit 64 is preferably equal to 20 cubic centimeters. The total combined internal volume of the second conduit 78 and the second segment 68 of the first conduit 64 is also preferably 20 cubic centimeters. The reason for this particular volume relationship will be explained hereinafter.

It should be noted that the conduits 64, 78 and 88 are preferably retained in proper position on the rear panel 16 by means of grooves molded into the front side 18 thereof into which the conduits are depressed, the conduits being retained therein by means of their inherent resiliency.

Figure 4:
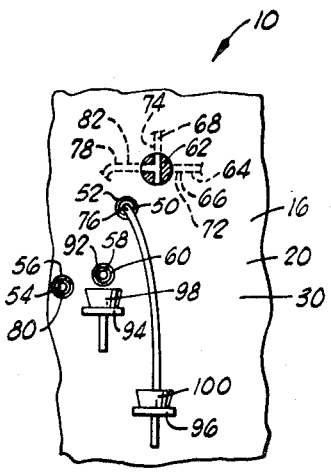
FIG. 4 is a fragmentary sectional view taken along line 4—4 of FIG. 3.

As shown in FIG. 4, supports 94 and 96 may be formed on the rear side 20 of the rear panel 16 for supporting receptacles 98 and 100, respectively, for purposes which will be described more fully hereinafter.

OPERATION OF THE PREFERRED EMBODIMENT

The teaching aid 10 is adapted for two different modes of operation. The first mode of operation illustrates the flow of a drug in the body in response to an orally administered pill. The second mode illustrates the flow of a drug in the body in response to an intravenous injection in the arm.

Assuming the instructor wishes to demonstrate the results of oral administration of a drug, he first places the valve 62 in the first mode position. When the valve 62 is in the first mode position flow is permitted through the valve from the second conduit 78 into the second segment 68 of the first conduit 64, while the first segment 66 of the first conduit 64 is closed to fluid flow. The operator then inserts a pill into one end 90 of the third conduit 88 through the aperture 84 in the head portion 28 of the front panel 22 thus simulating the oral ingestion of a drug in pill form. The pill passes downwardly through the transparent conduit 88 in the direction of the arrows and exits through the aperture 58 into the receptacle 98.

At this point the operator places a conventional hypodermic syringe, not shown, having the needle removed therefrom and filled with approximately 20 cubic centimeters of colored fluid, into sealing engagement with the grommet 56 thereby opening the grommet 56 to fluid flow from the syringe. The operator then depresses the plunger of the syringe and forces the colored fluid into one end 80 of the conduit 78 to simulate the circulation of a drug from the stomach throughout the body. As the plunger of the syringe continues to be depressed by the operator, the colored fluid flows through the conduit 78 and the second segment 68 of the first conduit 64 until the colored fluid flows out of the body model 14 through the aperture 50. When the plunger is fully depressed, the operator removes the syringe from the grommet 56. The colored fluid in the conduits 78 and 66 may then be drained by syphon action in the direction of the arrows into the receptacle 100. The syphon action may be induced by opening the grommet 56 slightly to release the vacuum in the conduits 78 and 66. It should be noted that the instructor can vary the speed of the colored fluid through the conduits by changing the rate of depression of the plunger in the syringe and can stop the flow of fluid through the conduits by ceasing to depress the plunger of the syringe. The operator may also draw the fluid back into the syringe by drawing the plunger back in the syringe.

When the instructor desires to demonstrate the intravenous injection of a drug, he first places the valve 62 in the second mode position thereby opening the entire first conduit 64 to fluid flow while blocking the conduit 78 to fluid flow. The instructor may then place a conventional syringe, as described above and filled with approximately 20 cubic centimeters of colored liquid into sealing engagement with the grommet 48 thereby opening the grommet 48 to fluid flow from the syringe. Depression of the plunger of the syringe will then force the colored fluid through the conduit 64 until it exits from the body model 14 through the aperture 50 in the rear panel 16. The instructor may then remove the empty syringe from sealing engagement with the grommet 48 thus allowing the colored liquid to be drained from the conduit 64 in the direction of the arrows into the receptacle 100 by means of syphon action. The syphon action may be induced by opening the grommet 48 slightly to release the vacuum in the conduit 64. As described above, the instructor can vary the speed of the colored fluid as it flows through the conduit 64, stop it entirely, or draw it back into the syringe by means of proper manipulation of the plunger in the syringe.

Proper syphon action as described above requires that the end 76 of segment 68 of the conduit 64 be positioned below the apertures 46 and 54. It may be desirable in certain applications to purge the conduits 64 and 78 by positive displacement of the fluid contained therein. In such case, the operator may use a fluid filled syringe, as described above, for this purpose.

It is readily apparent when viewing FIG. 2 that in the first mode the colored fluid appears to flow from the stomach organ member 40 to the heart organ member 38, from the heart organ member 38 to the brain organ member 36, from the brain organ member 36 back to the heart organ member 38, from the heart organ member 38 to the liver organ member 42, from the liver organ member 42 to the kidney organ member 44, and from the kidney organ member 44 back to the heart organ member 38. It is also readily apparent that, when in the second mode, the drug appears to flow from the point of injection in the right arm portion 32 of the body model 14 to the heart organ member 38, from the heart organ member 38 to the brain organ member 36, from the brain organ member 36 back to the heart organ member 38, from the heart organ member 38 to the liver organ member 42, from the liver organ member 42 to the kidney organ member 44, and from the kidney organ member 44 back to the heart organ member 38.

It should also be noted that the volume of colored fluid in the syringe is substantially equal to the volume of the conduit through which the fluid is to flow. This volume relationship permits the operator to illustrate one entire flow cycle through the teaching aid 10 with one syringe filled with colored fluid. It should be understood that although 20 cubic centimeters is a preferred volume, variations in volume may be required in different sizes of teaching aids.

From the foregoing detailed description of the teaching aid 10, it can be readily seen that the present invention provides an improved teaching aid which vividly demonstrates two different forms of drug circulation in the human body and which is simple to operate and economical to construct.

Changes may be made in the construction and arrangement of parts or elements of the various embodiments as disclosed herein without departing from the spirit and scope of the invention.

What is claimed is:

1. A teaching aid comprising:
    a base;
    a rear panel secured to the base and extending upwardly therefrom and having a front side and a rear side;
    a front panel in the general shape of the upper front portion of the human body and having an inner surface and an outer surface, said front panel being secured to the front side of said rear panel;
    a plurality of organ members each formed in the general shape of a human body organ and secured to the front side of said rear panel between said rear panel and said front panel; and
    first conduit means communicating with said front panel for conducting a fluid from a source beyond the outer surface of said front panel through said front panel and through said organ members.

2. A teaching aid as defined in claim 1 wherein said plurality of organ members is further characterized to include:
    a brain member;
    a heart member;
    a liver member; and
    a kidney member.

3. A teaching aid as defined in claim 1 further characterized to include:
    second conduit means communicating with said front panel for conducting a solid object from a source beyond the outer surface of said front panel to one of said organ members; and
    third conduit means communicating with said rear panel for conducting a fluid from a source beyond the rear side of said rear panel through said rear panel and through said organ members.

4. A teaching aid as defined in claim 3 wherein said plurality of organ members is further characterized to include:
    a brain member;
    a heart member;
    a liver member;
    a kidney member; and
    a stomach member.

5. A teaching aid as defined in claim 4 wherein:
    said front panel includes a head portion, a body portion, and an arm portion;
    said first conduit means communicates with the arm portion of said front panel and conducts the fluid through said heart member, said brain member, said liver member, and said kidney member;
    said second conduit means communicates with the head portion of said front panel and conducts the solid object to said stomach member; and
    said third conduit means conducts the fluid through said stomach member, said heart member, said brain member, said liver member and said kidney member.

6. A teaching aid as defined in claim 1 wherein:
    said plurality of organ members is further characterized to include a brain member, a heart member, a stomach member, a liver member and a kidney member;
    said front panel is formed of a transparent material and is further characterized to include a head portion, a body portion and at least one arm portion; and
    said first conduit means is further characterized to include a first transparent conduit having opposite ends and disposed between said front and rear panels, one end of said first conduit extending through the arm portion of said front panel, said first conduit being routed from the arm portion to said heart member, from said heart member to said brain member, from said brain member back to said heart member, from said heart member to said liver member, from said liver member to said kidney member, and from said kidney member back to said heart member, the opposite end of said first conduit extending through said rear panel adjacent to said heart member.

7. A teaching aid as defined in claim 6 further characterized to include:
    a second transparent conduit having opposite ends and disposed between said front and rear panels, one end of said second conduit extending through said rear panel adjacent to said stomach member, said second conduit being routed from said stomach member to said heart member; and
    valve means positioned in said first conduit at the point of entrance of said first conduit into said heart member from the arm portion and connected to the opposite end of said second conduit for controlling the flow of fluid through said first and second conduits.

8. A teaching aid as defined in claim 7 further characterized to include:
a third transparent conduit having opposite ends and disposed between said front and rear panels, one end of said third conduit extending through the head portion of said front panel, said third conduit being routed from the head portion to said stomach member, the opposite end of said third conduit extending through said rear panel adjacent to said stomach member.

* * * * *